United States Patent
Oh et al.

(10) Patent No.: US 9,137,626 B2
(45) Date of Patent: Sep. 15, 2015

(54) METHOD AND APPARATUS FOR TRANSMITTING WIRELESS PERSONAL AREA NETWORK COMMUNICATION SYSTEM

(71) Applicant: Electronics and Telecommunications Research Institute, Daejeon (KR)

(72) Inventors: Mi Kyung Oh, Daejeon (KR); Byoung Hak Kim, Daejeon (KR); Cheol-ho Shin, Daejeon (KR); Jaehwan Kim, Daejeon (KR); Sangsung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/286,874

(22) Filed: May 23, 2014

(65) Prior Publication Data
US 2015/0201296 A1    Jul. 16, 2015

(30) Foreign Application Priority Data

Jan. 16, 2014    (KR) .................. 10-2014-0005744

(51) Int. Cl.
*H04W 4/00* (2009.01)
*G08C 17/02* (2006.01)

(52) U.S. Cl.
CPC .............. *H04W 4/005* (2013.01); *G08C 17/02* (2013.01)

(58) Field of Classification Search
USPC ........... 375/308, 295; 370/338, 474; 714/758, 714/752
See application file for complete search history.

(56) References Cited

U.S. PATENT DOCUMENTS

| | | | |
|---|---|---|---|
| 8,391,405 B2 | 3/2013 | Kwon et al. | |
| 2006/0007898 A1* | 1/2006 | Maltsev et al. | 370/338 |
| 2011/0044271 A1 | 2/2011 | Hong et al. | |
| 2011/0051706 A1* | 3/2011 | Schmidl et al. | 370/338 |
| 2012/0106529 A1* | 5/2012 | Ferchland et al. | 370/338 |
| 2013/0058360 A1 | 3/2013 | Oh et al. | |
| 2013/0246883 A1* | 9/2013 | Shinya et al. | 714/752 |
| 2013/0311850 A1* | 11/2013 | Shinohara et al. | 714/758 |
| 2014/0016653 A1* | 1/2014 | Oh et al. | 370/474 |

FOREIGN PATENT DOCUMENTS

| EP | 2 219 396 A1 | 8/2010 |
|---|---|---|
| KR | 10-2009-0075597 A | 7/2009 |

OTHER PUBLICATIONS

"Terrestrial Trunked radio (TETRA); Packet Data Optimized (PDO); Part 2: Air Interface (AI)", ETS 300 393-2, Apr. 1999, p. 25~58.

* cited by examiner

*Primary Examiner* — Eva Puente

(57) ABSTRACT

A transmitting apparatus of a WPAN communication system generates a synchronization header, a physical layer header, and a physical layer service data unit, multiplexes the synchronization header and the physical layer header into a bit stream and then modulates the multiplexed bit stream by a first differential phase modulation scheme, modulates the physical layer service data unit by a second differential phase modulation scheme, and multiplexes and transmits a symbol modulated by the first differential phase modulation scheme and a symbol modulated by the second differential phase modulation scheme into a symbol stream.

20 Claims, 14 Drawing Sheets

FIG. 4

| Data Rate | 18Kbps | 36Kbps | 27Kbps | 54Kbps | 9Kbps | unit |
|---|---|---|---|---|---|---|
| Channel BW | 0.025 | 0.025 | 0.025 | 0.025 | 0.025 | MHz |
| Modulation | π/4 DQPSK | π/4 DQPSK | π/4 DQPSK | π/4 DQPSK | π/4 DQPSK | |
| Symbol Rate | 18 | 18 | 18 | 18 | 18 | Ksps |
| RX Thermal Noise | -130 | -130 | -130 | -130 | -130 | dBm |
| MF | 10 | 10 | 10 | 10 | 10 | dB |
| RX Noise | -120 | -120 | -120 | -120 | -120 | dBm |
| Required SNR (BER $10^{-5}$) | 12 | 12 | 16 | 16 | 12 | dB |
| Implementation Loss | 3 | 3 | 3 | 3 | 3 | dB |
| PHY Gain (Encoding & Spreading) | 7 | 0 | 7 | 0 | 10 | dB |
| Receiver Sensitivity | -112 | -105 | -108 | -101 | -115 | dBm |

FIG. 5

| BIT STREAM INDEX | 0 | 1 | 2 | 3-4 | 5-13 | 14-17 |
|---|---|---|---|---|---|---|
| BIT MAPPING | - | 1BIT | 1BIT | 2BIT | 9BIT | 4BIT |
| FIELD NAME | EXTENDED (extended) | WHITENING | FEC MODE | Rate MODE | PARITY LENGTH | BCH PARITY |

S(k): Modulated Symbol

S(k): Modulated Symbol
f(s(k)): phase modulation, conjugate operation, etc

B(k): Bit group (EX: GROUP OF 2 BITS OR 3 BITS)

FIG. 9

| PHR(18BITS) | 6-ZERO BIT | PDSU | 6-ZERO BIT | PAD BIT |

METHOD AND APPARATUS FOR TRANSMITTING WIRELESS PERSONAL AREA NETWORK COMMUNICATION SYSTEM

CROSS-REFERENCE TO RELATED APPLICATION

This application claims priority to and the benefit of Korean Patent Application No. 10-2014-0005744 filed in the Korean Intellectual Property Office on Jan. 16, 2014, the entire contents of which are incorporated herein by reference.

BACKGROUND OF THE INVENTION (a) Field of the Invention

The present invention relates to a method and an apparatus for transmitting a wireless personal area network (WPAN) communication system, and more particularly, to a method and an apparatus for transmitting a WPAN communication system for an advanced metering infrastructure (AMI) for a smart grid.

(b) Description of the Related Art

A smart grid wireless communication technology which is used as a bi-directional wireless communication infrastructure between a power supplier and a consumer in a smart grid consumer area may achieve high efficiency of energy depending on power consumption and a power use charge, check an abnormal state in a transmission/distribution facility early to prevent unnecessary power leakage, and stably maintain a national power grid, and therefore has emerged as a core technology to build up a national infrastructure for low-carbon green industry.

At present, an AMI technology for a smart grid based on power line communication (PLC) technology has been developed in the nation. Recently, as portable terminals are widely distributed, a ZigBee-based wireless AMI technology has been developed. However, problems of generation of a shadow area due to a lack of ZigBee communication performance and difficulty in commercialization due to a lack of coverage have occurred.

Instead of the ZigBee communication with an interference problem due to frequency sharing with Wi-Fi, etc., in a 2.4 GHz industrial scientific and medical (ISM) band, a demand for technical development of low power/low cost wireless transmission which uses a frequency bandwidth (sub-giga-band of 380 MHz to 400 MHz) for a trunked radio system to be able to stably and freely exchange utility-related information, such as electricity/gas/water information, between a supplier and a consumer without interference has increased.

In particular, development of a wireless personal area network (WPAN) communication system for AMI with reliability has been required to provide AMI services for the smart grid, and most of the AMI services for the smart grid need to be processed in a single hop with extended communication coverage of 1 km or more. Further, the WPAN communication system for AMI has various transmission rates to be used in the AMI services for the smart grid so as to be able to be used in various applications such as remote metering and monitoring of a transmission/distribution power facility.

Korea Electric Power Corporation, which plays a leading role in the domestic smart grid industry, uses commercial products meeting a terrestrial trunked radio (TETRA) standard in a frequency bandwidth for a trunked radio system to experimentally perform the AMI services. However, with the TETRA standard it may be difficult to smoothly provide the AMI services due to a low transmission rate of 4.5 Kbps per user and may cause the increase in complexity and costs to build up infrastructure. Further, the TETRA standard itself is constructed to meet only voice data transmission, and therefore is inappropriate for the AMI services.

Therefore, standardization of a new communication method specialized for the AMI services for the smart grid in the frequency bandwidth for the trunked radio system with good frequency characteristics has been required. In particular, a need exists for a new AMI communication technology for a smart grid to solve a problem of reduced reliability and communication range which is a drawback of ZigBee and a problem of low transmission rate and high infrastructure construction cost which is a drawback of TETRA.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for transmitting a WPAN communication system capable of provide AMI services for a smart grid with reliable communication quality and various transmission rates in a frequency bandwidth for a trunked radio system.

An exemplary embodiment of the present invention provides a method for transmitting a signal in an allocated frequency bandwidth by a transmitting apparatus of a WPAN communication system. The transmitting method includes: generating a synchronization header, a physical layer header, and a physical layer service data unit; multiplexing the synchronization header and the physical layer header into a bit stream; modulating the multiplexed bit stream by a first differential phase modulation scheme; modulating the physical layer service data unit by a second differential phase modulation scheme; multiplexing a symbol modulated by the first differential phase modulation scheme and a symbol modulated by the second differential phase modulation scheme into a symbol stream; and transmitting the symbol stream.

The transmitting method may further include forward error correction encoding the physical layer service data unit, before the modulating of the physical layer service data unit.

The transmitting method may further include scrambling the physical layer service data unit, before the modulating of the physical layer service data unit.

The transmitting method may further include spreading the physical layer service data unit, before or after the modulating of the physical layer service data unit.

The spreading before the modulating of the physical layer service data unit may include repeating the bit stream of the physical layer service data unit in a bit group unit.

The bit group may include bits of the number of bits configuring one symbol or bits obtained by multiplying the number of bits configuring one symbol by the predetermined number of symbols.

The spreading may include adding padding behind each bit group.

After the modulating of the physical layer service data unit, the spreading may include: adjacently repeating the symbols; and changing the symbols to be repeated.

The transmitting method may further include at least one of: before the modulating of the multiplexed bit stream, forward error correction encoding the physical layer header; and before or after the modulating of the multiplexed bit stream, spreading the physical layer header.

The first modulation scheme may include a π/4 DQPSK scheme and the second modulation scheme may include the π/4 DQPSK or a π/8 D8PSK.

The synchronization header may include a preamble, and the generating may include generating a first preamble sequence and a second preamble sequence used as the preamble.

The modulating of the bit stream may include differently setting reference phases for each channel.

The physical layer header may include a length of the physical layer service data unit and information required to recover the physical layer service data unit, and the information required to recover the physical layer service data unit may include at least one of a modulation scheme, whether scrambling is applied, whether the forward error correction encoding is applied, and whether spreading is applied.

The transmitting method may further include interleaving the physical layer service data unit, before the modulating of the physical layer service data unit.

The physical layer service data unit may include a response signal to a success/failure of the reception of a packet.

Another embodiment of the present invention provides a transmitting apparatus of a WPAN communication system. The transmitting apparatus includes a packet generator, a first modulator unit, a second modulator unit, and a transmitter. The packet generator generates a synchronization header, a physical layer header, and a physical layer service data unit. A first modulator modulates the synchronization header and the physical layer header by a first differential phase modulation scheme. A second modulator modulates the physical layer service data unit by a second differential phase modulation scheme. The transmitter transmits a symbol modulated by the first differential phase modulation scheme and a symbol modulated by the second differential phase modulation scheme.

The synchronization header may include a preamble and the preamble may include at least two preamble sequences.

The transmitting apparatus may further include a spreader. The spreader may spread the physical layer header and the physical layer service data unit before modulating the physical layer header and the physical layer service data unit.

The spreader may repeat the physical layer header and a bit stream of the physical layer service data unit, respectively, in a bit group unit, and the bit group may include bits of the number of bits configuring one symbol or bits obtained by multiplying the number of bits configuring one symbol by the predetermined number of symbols.

The transmitting apparatus may further include: at least one of a scrambler scrambling the physical layer service data unit; an encoder performing forward error correction encoding on the physical layer service data unit; and an interleaver interleaving the physical layer service data unit, before modulating the physical layer service data unit.

BRIEF DESCRIPTION OF THE DRAWINGS

FIG. 4 is a diagram illustrating link budgets of each transmission mode of the transmitting apparatus according to the exemplary embodiment of the present invention.

FIG. 5 is a diagram illustrating a PHR of an AMI WPAN packet according to an exemplary embodiment of the present invention.

FIG. 9 is a diagram illustrating an extension method of PHR and PSDU of an encoder illustrated in FIG. 2.

DETAILED DESCRIPTION OF THE EMBODIMENTS

Figure 1:
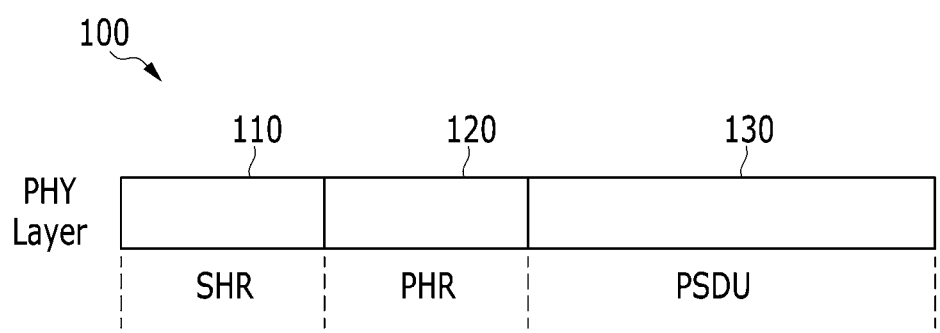
FIG. 1 is a diagram illustrating a packet structure of a WPAN communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, a method and an apparatus for transmitting a WPAN communication system according to an exemplary embodiment of the present invention will be described in detail with the accompanying drawings.

First, requirements of the WPAN communication system for AMI services for a smart grid will be described.

A service which performs remote metering using meters of detached houses of downtown area/sub-central area/farming and fishing village corresponds to a case in which a data concentrator unit (DCU) mounted at a pole mainly collects data from meters of each detached house. In this case, reliable communication needs to be secured within 100 m from the downtown area, 200 m from the sub-central area, and 300 m from the farming and fishing village. Further, one DCU needs to collect information from at least 200 meters and requires about 300 bytes of data per meter. A smart grid power facility monitoring service corresponds to a case in which a repeater collects data of the power facility. In this case, reliable communication within LOS of 1 Km needs to be performed.

Therefore, a transmission mode of maximizing a transmission rate within a given frequency bandwidth and maximizing receiver sensitivity to provide communication even in poor environment is required. Since in a frequency bandwidth for a trunked radio system, a given channel interval is 25 KHz and an occupied bandwidth is 23 KHz or so, a wireless transmitting apparatus needs to be designed in consideration of the frequency channel interval and the occupied bandwidth. Further, since an AMI service scenario is appropriate for a star network and therefore a simple packet-based communication mode based on the IEEE 802.15.4 mode which is a low-rate WPAN standard may be considered to be appropriate.

FIG. 1 is a diagram illustrating a packet structure of a WPAN communication system according to an exemplary embodiment of the present invention.

Referring to FIG. 1, a WPAN packet 100 (hereinafter referred to as "AMI WPAN packet") of a physical layer for AMI services for a smart grid follows an IEEE 802.15.4 basic packet structure.

An AMI WPAN packet 100 may include a synchronization header (SHR) 110, a physical layer (PHY) header (PHR) 120, and a physical layer (PHY) service data unit (PSDU) 130.

The SHR 110 is for packet detection and synchronization acquisition and includes a preamble.

The PHR 120 includes information on a length, a transmission mode, etc., of the PSDU.

The PSDU 130 includes real data. The data includes utility related data, that is, AMI data, such as electricity/gas/water data. The PSDU may have a size of up to 511 bytes to accommodate 300-byte data which is one of the requirements of AMI.

Figure 2:
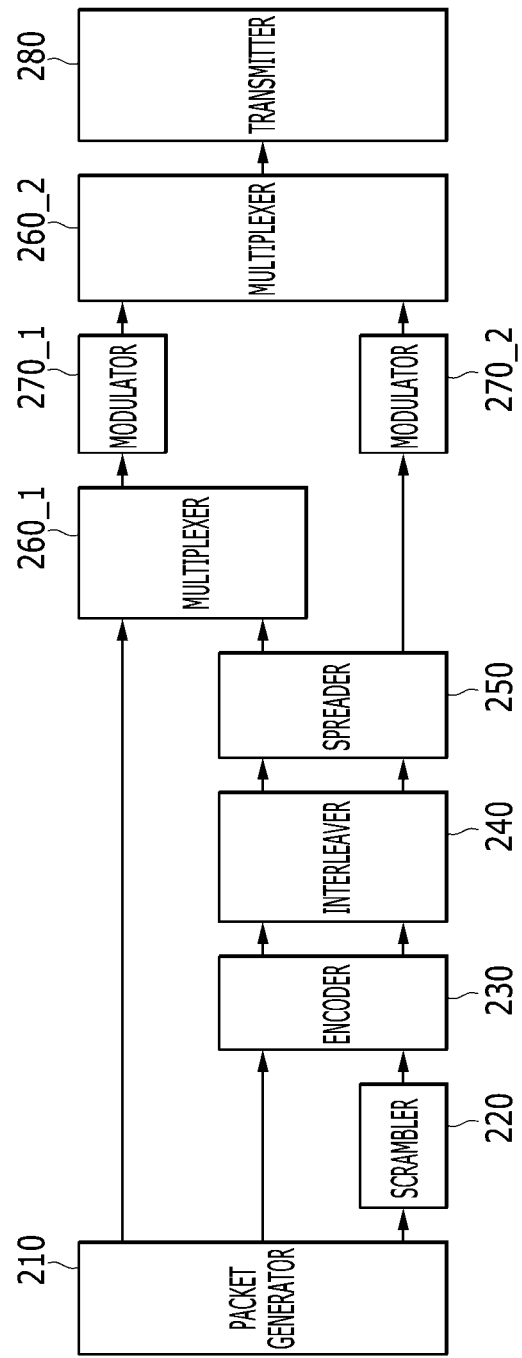
FIG. 2 is a diagram illustrating a transmitting apparatus of the WPAN communication system according to the exemplary embodiment of the present invention.

FIG. 2 is a diagram illustrating a transmitting apparatus of the WPAN communication system according to the exemplary embodiment of the present invention.

Referring to FIG. 2, a transmitting apparatus 200 includes a packet generator 210, a scrambler 220, an encoder 230, an interleaver 240, a spreader 250, multiplexers 260_1 and 260_2, modulators 270_1 and 270_2, and a transmitter 280.

The packet generator 210 generates an AMI WPAN packet in the frequency bandwidth for the trunked radio system. The AMI WPAN packet has a structure of FIG. 1.

The packet generator 210 outputs the SHR of the AMI WPAN packet to the multiplexer 260_1, outputs the PHR of the AMI WPAN packet to the encoder 230, and outputs the PSDU of the AMI WPAN packet to the scrambler 220.

The scrambler 220 scrambles the PSDU and outputs the scrambled PSDU to the encoder 230. The scrambling is called whitening and generally has two purposes. The first purpose is to make an average spectrum shape of a signal and the second purpose is to maintain security of the signal. Therefore, depending on the purposes, as the scrambling of a static scramble sequence or a dynamic scramble sequence is used. The static scramble sequence is defined to have a constant structure. When the static scramble sequence is used, bit scrambling is optionally applied to the PHR or the PSDU of the packet. It may be seen from the PHR or the preamble whether a scrambling application method may be applied. For example, if it is assumed that the scrambling is not applied to the PHR, it may be seen from a bit part of the PHR whether the scrambling is applied to the PSDU. Unlike this, when it is informed whether the scrambling is applied by using the preamble, it may be determined whether the scrambling is applied to the PHR or the PSDU depending on what type of preamble sequence it is. For example, the preamble sequence using a specific sequence may show that the scrambling is applied to the PHR or the PSDU, and the preamble sequence using specific sequences different therefrom may show that the scrambling is not applied thereto. Therefore, it may be seen whether the scrambling is applied to the PHR or the PSDU depending on the determination on the preamble sequence. The application of the scrambling may usually depend on the following Equation 1.

$$X(n)=b(n) \, xor \, s(n) \qquad \text{(Equation 1)}$$

In the above Equation 1, s(n) is a scramble sequence and b(n) is an input bit sequence. xor represents an exclusive or operation.

In this case, the used s(n) is generated from a specific defined structure or formula, but may be a general sequence used for encryption. Unlike this, the scrambling may depend on the following Equation 2. The scrambling depending on the following Equation 2 may be adopted in a self-scrambler.

$$X(n)=f(b(n),X(n-1),\ldots,X(n-K)) \qquad \text{(Equation 2)}$$

In the above Equation 2, f (x1, x2, x3, . . . , x(K+1)) is a binary function.

Differently from the static scrambling, in the case of the dynamic scrambling, a method of changing a state value, which is a seed of the scrambler 220, depending on predetermined conditions or changing a function of the scrambler 220 may be used. In this case, a method of changing the seed or the function of the scrambler 220 may be used a method of using an agreed value among communication individuals, a method of selecting the scrambler 220 at a constant sequence, and a method of selecting the scrambler 220 depending on the preamble.

First, in the case in which the communication individuals perform the mutual negotiation on the structure or the seed value of the scrambler, the structure or the seed value of the scrambler 220 is changed only when it is confirmed that the agreement is completed. When the communication continuously fails, a method which uses the predetermined structure or seed value of the scrambler 200 or a method which does not use the scrambler 220 is used.

Second, when the scrambler 220 is changed depending on a constant sequence, the scrambler 220 is configured in a predefined constant order at the time of generating the packet and a decoding thereof is performed at a receiving terminal depending on an order. In this case, when communication fails, a method which again starts the corresponding sequence from the beginning or does not apply the scrambler 220 may be selected.

Third, when the scrambler 220 is changed depending on a kind of sequence used in the preamble, the scrambler 220 is selected based on a function for the construction of the preamble sequence. That is, a specific preamble sequence is mapped to the seed or the function of the specific scrambler and thus the receiving terminal analyzes the preamble sequence, thereby differentiating whether the scrambler is present and a kind of scrambler. That is, it is determined whether the scrambling is used or the seed or the function of the scrambler may be differently used, depending on a kind of sequence which is used in the preamble. For example, preamble sequence A may represent that the scrambler 220 is not applied, preamble sequence B may represent a use of seed 1, preamble sequence C may represent a use of seed 2, and preamble sequence D may represent a use of function 1.

The encoder 230 performs forward error correction (FEC) encoding on the PHR and the scrambled PSDU and outputs the encoded scrambled PSDU to the interleaver 240. The encoder 230 may obligatorily perform the FEC encoding on the PHR and obligatorily or optionally perform the FEC encoding on the PSDU.

The interleaver 240 interleaves the FEC encoded PHR and PSDU and outputs the interleaved PHR and PSDU to the spreader 250. The interleaving of the interleaver 240 on the PHR may be obligatorily performed and the interleaving of the interleaver 240 on the PSDU may be obligatorily or optionally performed.

The spreader 250 spreads the interleaved PHR and PSDU, and then outputs the PHR to the multiplexer 260_1 and outputs the PSDU to the modulator 270_2. The spreader 250 obligatorily spreads the PHR and may obligatorily or optionally spread the PSDU.

The multiplexer 260_1 multiplexes the SHR and the PHR which is spread by the spreader 240 into one bit stream and then outputs the multiplexed SHR and PHR to the modulator 270_1.

The modulator 270_1 modulates the bit stream output from the multiplexer 260_1 by a predetermined modulation scheme and outputs the modulated bit stream to the multiplexer 260_2.

The modulator 270_2 modulates the PSDU spread by the spreader 240 into symbols using the predetermined modulation scheme and outputs the symbols to the multiplexer 260_2.

The modulators 270_1 and 270_2 use a modulation scheme which has good spectral efficiency so as to obtain a transmission rate as high as possible within the given occupied bandwidth, and is robust against a channel problem which may be caused when a packet length is long at a relatively lower transmission rate. For example, the modulators 270_1 and 270_2 may use a differential phase shift keying (DPSK) modulation scheme, and may use a π/4 DQPSK scheme and a π/8 D8PSK scheme to reduce a phase difference in bit translation. In particular, the modulator 270_1 may use the π/4 DQPSK scheme as the modulation scheme and the modulator 270_2 may use the π/4 DQPSK scheme or the π/8 D8PSK scheme as the modulation scheme. That is, the SHR and the PHR may be modulated by the π/4 DQPSK scheme and the PSDU may be modulated by the π/4 DQPSK scheme or the π/8 D8PSK scheme.

The multiplexer 260_2 multiplexes the symbols modulated by the modulators 270_1 and 270_2 into one symbol stream and outputs the multiplexed symbol stream to the transmitter 280.

The transmitter 280 performs root raised cosine (RRC) and low pass filter (LPF) filtering on the symbol stream and transmits the filtered symbol stream.

Figure 3:
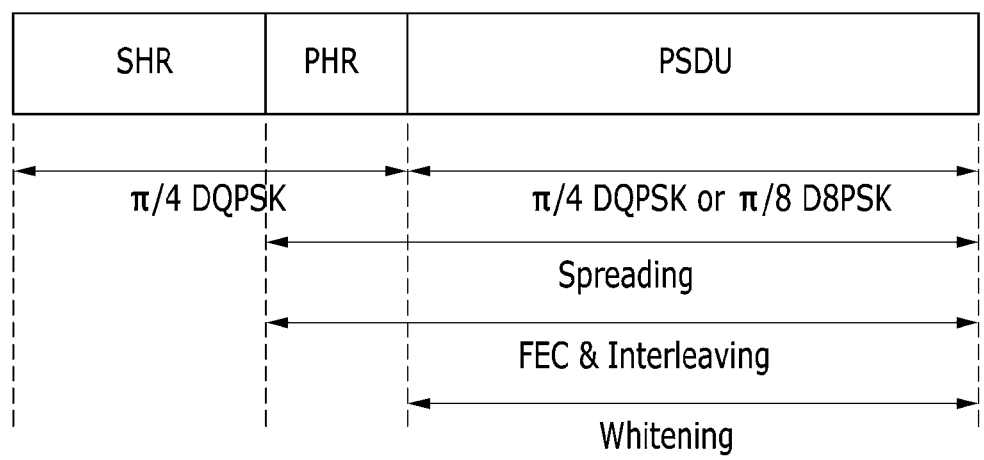
FIG. 3 is a diagram schematically illustrating a packet processing method of the transmitting apparatus of a WPAN communication system according to the exemplary embodiment of the present invention.

A method of processing an AMI WPAN packet 100 in the transmitting apparatus 200 is schematically illustrated in FIG. 3.

FIG. 3 is a diagram schematically illustrating a packet processing method of the transmitting apparatus of a WPAN communication system according to the exemplary embodiment of the present invention.

Referring to FIG. 3, the SHR and the PHR are modulated by a common modulation scheme, for example, the π/4 DQPSK scheme. To maximize the reliability of the PHR including important information, the FEC encoding and the spreading may be obligatorily performed on the PHR, and the whitening (scrambling), the FEC encoding, the interleaving, and the spreading may be optionally performed thereon. Further, the PSDU may be modulated by the π/4 DQPSK scheme or the π/8 D8PSK scheme depending on the information on the PHR.

The PHR basically includes information required to recover the PSDU. Since an operation SNR of the PSDU is 2 dB or so, the PHR needs to secure the reliability to be recovered in the SNR. Therefore, the FEC encoding, the spreading, and the interleaving may also be obligatorily performed on the PHR.

As such, the transmitting apparatus 200 may perform the FEC encoding on the PSDU to improve the reliability of the PSDU. At the time of using a convolutional code of which the code rate is 2/1 and K=7, a coding gain of 7 dB may be obtained. Further, to more obtain a gain by a simple method, the spreading may be performed on the PSDU.

FIG. 4 is a diagram illustrating link budgets of each transmission mode of the transmitting apparatus according to the exemplary embodiment of the present invention.

Referring to FIG. 4, the transmitting apparatus according to the exemplary embodiment of the present invention may have a data rate which ranges from 9 Kbps to 54 Kbps and therefore may have a higher transmission rate than that of the existing TETRA system.

Reviewing receiver sensitivity representing an index on whether to recover the packet in poor environment, the receiver sensitivity is −101 dBm to −115 dBm, and therefore it may be appreciated that 10 to 20 dB is more improved, compared to a ZigBee system.

The transmission mode of the transmitting apparatus 200 is controlled depending on a modulation order (M=4/8) and whether the FEC encoding and the spreading are applied, and a user may select the modulation order or whether the FEC encoding and the spreading are applied or may adaptively change the transmission mode in MAC, so as to meet the given AMI service and the surrounding communication environment.

FIG. 5 is a diagram illustrating a PHR of an AMI WPAN packet according to an exemplary embodiment of the present invention.

Referring to FIG. 5, the PHR is configured of 18 bits, and includes a data whitening field, an FEC mode field, a rate mode field, a frame length field, and a parity field. Further, the PHR may further include an extended field.

The whitening field represents whether the scrambling is applied to the PSDU, and is configured of 1 bit and may be mapped to bit stream index 1.

The FEC mode field represents whether the FEC encoding is applied to the PSDU, and is configured of 1 bit and may be mapped to bit stream index 2.

The rate mode field represents the modulation scheme of the PSDU and whether the spreading is applied to the PSDU, and is configured of 2 bits and may be mapped to bit stream indexes 3 and 4.

The frame length field represents a length of the PSDU of 511 bytes, and is configured of 9 bits for the PSDU of 511 bytes and may be mapped to bit stream indexes 5 to 13.

The packet generator 210 performs BCH encoding on data of 11 bits from bit stream index 3 to bit stream index 13 to be able to generate BCH parity of 4 bits, in which the BCH parity of 4 bits is included in the parity field. The BCH parity may be mapped to bit stream indexes 14 to 17.

In this case, the BCH code used in the BCH encoding is BCH (15, 11, 1), and the BCH parity of 4 bits is used for 1 bit error correction. The reason for using the BCH is to additionally protect length information, and when an error occurs in the length information, even though the PSDU is recovered, an error occurs, and therefore the PSDU is discarded. Instead of the BCH parity, a simple odd/even parity is repeated and thus may be inserted into the parity field.

Further, when the information to be included in the PHR is added later, the extended field of the PHR is used The added information may be disposed after the current PHR.

The modulation scheme of the π/4 DQPSK scheme or the π/8 D8PSK scheme for the PSDU is determined depending on the information on the PHR, and the FEC encoding, the spreading, and the whitening may be performed thereon.

Figure 6:
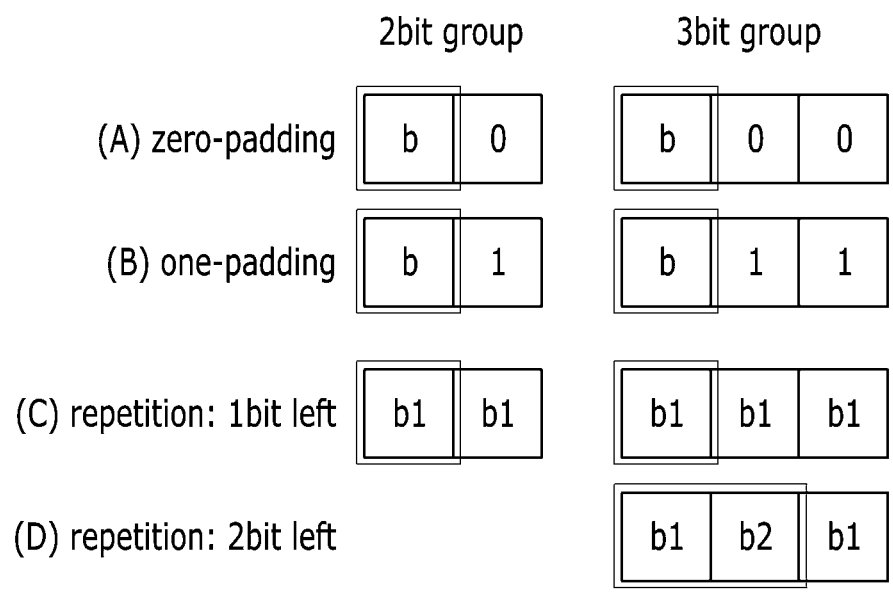
FIG. 6 is a diagram illustrating a bit padding method for last symbol mapping of a modulation unit according to an exemplary embodiment of the present invention.

FIG. 6 is a diagram illustrating a bit padding method for last symbol mapping of a modulation unit according to an exemplary embodiment of the present invention.

Referring to FIG. 6, the transmitting apparatus 200 uses the π/4 DQPSK scheme or the π/8 D8PSK scheme as the modulation scheme, and in the π/4 DQPSK scheme or the π/8 D8PSK scheme, a specific number of bits is mapped to one symbol. For example, 2 bits may be mapped to one symbol, 3 bits may be mapped to one symbol, and 6 bits may be mapped to one symbol.

When a total number of transmission bits is a multiple of 2, mapping 2 bits to one symbol may be performed without any problem, but mapping 3 bits to one symbol may be problematic. When the transmission bits are not grouped into required 2 bits, 3 bits, or the like at the last symbol position, padding is required. The padding is performed in the modulators 270_1 and 270_2. In this case, as the padding method, there are a method of simply inserting 0 or 1 as illustrated in FIG. 6 A or B and a method of repeating transmission bits as illustrated in FIGS. 6 C and D.

For example, when only 1 bit remains, there is a need to generate a 2-bit group for symbol mapping, such that the modulators 270_1 and 270_2 may insert 0 as illustrated FIG. 6 A, insert 1 as illustrated in FIG. 6 B, and generate 2 bits by repeating a bit as illustrated in FIG. 6 C.

For example, when only 1 bit remains, there is a need to generate a 3 bit group for the symbol mapping, such that the modulators 270_1 and 270_2 may insert 0 as illustrated FIG. 6 A, insert 1 as illustrated in FIG. 6 B, and generate 3 bits by repeating the remaining bits as illustrated in FIG. 6 C.

When 2 bits remain as illustrated in FIG. 6 D, there is a need to generate the 3 bit group for symbol mapping, such that the modulators 270_1 and 270_2 may also repeat a first bit among the remaining 2 bits and may also repeat a second bit of the remaining 2 bits.

Figure 7:
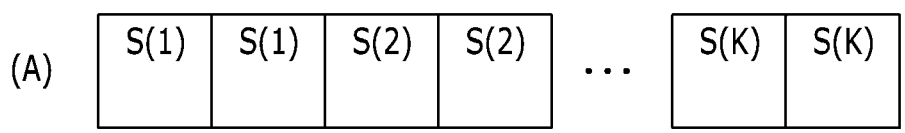
FIGS. 7 and 8 are each diagrams illustrating a spreading method of a spreader illustrated in FIG. 2.
Figure 7:
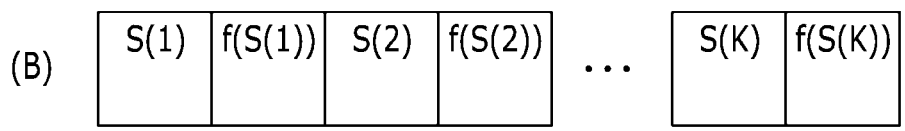
Figure 7:
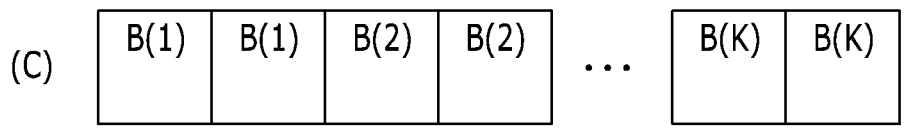
Figure 8:
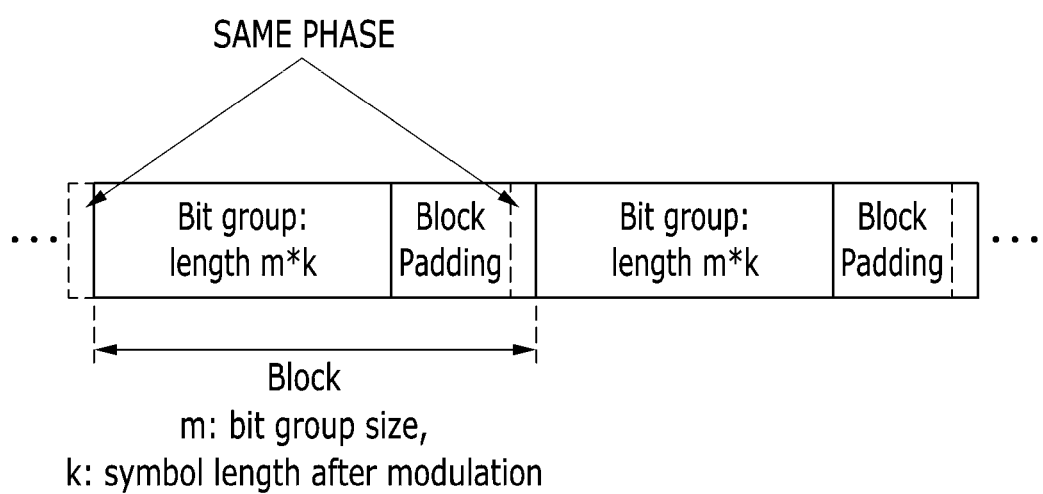

FIGS. 7 and 8 are each diagrams illustrating a spreading method of a spreader illustrated in FIG. 2.

Referring to FIG. 7, the spreader 250 may also perform the spreading on the PHR and the PSDU to improve the demodulation/decoding performance of the receiving terminal. As one spreading method, there is a repetition method of repeatedly transmitting a signal.

In the case of the DQPSK or the D8PSK, one symbol is configured of a 2-bit unit or a 3-bit unit. As the method of repeating a symbol, a method of repeating a symbol after differential modulation and a method of repeating a symbol as a bit group before differential modulation may be used.

A method of simply repeating a symbol in a time domain is illustrated in FIG. 7 A. However, the method is not defined by constellation in the differential modulation. Therefore, the spreader 250 may change symbol S(X) to be repeated as illustrated in FIG. 7 B. For example, when the spreader 250 repeats the symbol S(X), the symbol S(X) may be subjected to phase modulation and a signal value f(S(X)) which is subjected to the phase modulation may be output. As the method of changing a symbol S(X), the spreader 250 may use a conjugate operation in addition to the phase modulation. In this case, the spreader 250 may be positioned behind the modulators 270_1 and 270_2.

Unlike this, the spreader 250 may divide the PHR and the PSDU into a bit group of as many as the number of bits configuring one symbol before the PHR and the PSDU are subjected to the differential modulation and repeat each bit group. That is, the spreader 250 divides the PHR and the PSDU into a bit group of 2 bits or 3 bits depending on the modulation scheme and repeats each bit group. In this case, a bit is repeated before the differential modulation is performed, but different waveforms appear in the time domain after the differential modulation is performed.

When the symbol is repeated after the differential modulation is performed, the receiving terminal combines the signals in the time domain and then performs the differential demodulation, and when the bit group is repeated before the differential modulation is performed, the receiving terminal performs the differential demodulation and then combines the signals.

According to the method illustrated in FIGS. 7 B and C, the signals repeated in a symbol unit are transmitted, while being adjacent to each other. Unlike this, the signal may be repeated in at least two symbol units.

As illustrated in FIG. 8, the spreader 250 may divide the PHR and the PSDU into the bit group of as many as the number of bits configuring at least two symbols and repeat each bit group. That is, the length of the bit group is a product of the number (K) of symbols configuring the bit group by the number (m) of bits configuring one symbol.

For example, the spreader 250 divides bits configuring 8 symbols into one bit group and repeats the bit group. By doing so, the 8 symbols are transmitted and then the same 8 symbols are repeatedly transmitted.

The spreader 250 may add block padding to the first or last of each bit group to make start phases of each bit group be the same. In this case, a combination of one bit group with the block padding may be defined by one block. When the bit group is subjected to the differential modulation, since the differential modulation is performed based on the phase of the symbol immediately before the bit group, to equally adjust the reference phase, the spreader 250 may arbitrarily add a bit to the first or last of each bit group so that the phases of the symbols immediately before each bit group are the same. By doing so, the waveforms of the blocks are the same in the time domain and therefore the receiving terminal may combine the signals in the time domain. The method described in FIG. 5 may be applied. By doing so, the signals may be combined at the receiving terminal in the time domain and then subjected to the differential demodulation, or may be subjected to the differential demodulation and then combined and processed.

In this case, the entire size of the PSDU or the entire structure of the packet may be repeated.

FIG. 9 is a diagram illustrating an extension method of PHR and PSDU of an encoder illustrated in FIG. 2.

As illustrated in FIG. 9, the encoder 230 extends the PHR and the PSDU prior to performing the FEC encoding on the PHR and the PSDU. That is, the encoder 230 may add a zero bit behind the PHR and the PSDU in connection with the PHR and the PSDU, respectively, and may add a pad bit behind the zero bit of the PSDU.

For example, a 6-zero bit may be added behind the PHR and the PSDU, respectively, and when the encoder 230 is used as a convolutional coder of which K=7, the 6-zero bit is to transmit the state of the convolutional coder as 0. Further, the pad bit is added to meet the size of the interleaver 240.

The encoder 230 extends the PHR and the PSDU and then performs the FEC encoding thereon.

As such, after the PHR and the PSDU are subjected to the FEC encoding, the interleaver 230 performs interleaving thereon.

Figure 10:
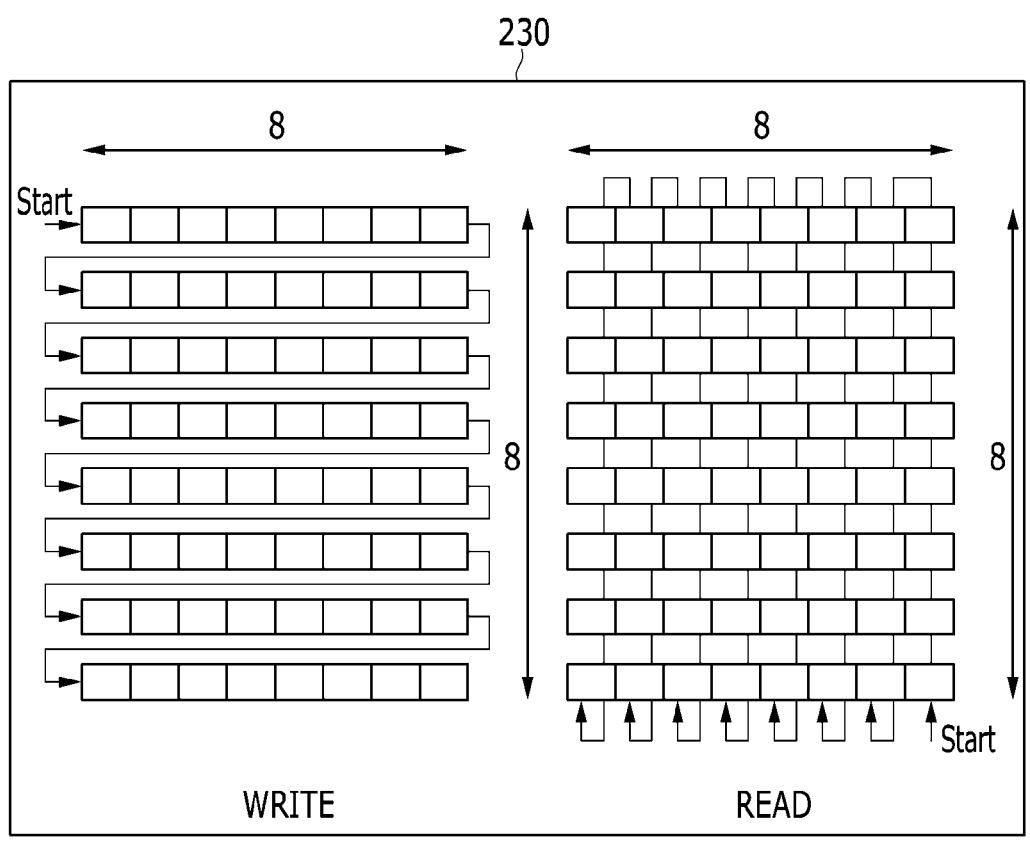
FIG. 10 is a diagram illustrating a structure of an interleaver illustrated in FIG. 2.

FIG. 10 is a diagram illustrating a structure of an interleaver illustrated in FIG. 2.

Referring to FIG. 10, the interleaver 230 has a matrix form which is configured of a row and a column and writes a bit input to the interleaver 230 in a row direction and reads the bit in a column direction, thereby interleaving the PHR and the PSDU, respectively. The interleaver 230 may be implemented with a size of 64 as illustrated in FIG. 10, that is, a size in which a depth level of the column is 8 and a depth length of the row is 8, in consideration of implementation.

In this case, the size of the interleaver 230 of the PHR and the PSDU may be differently configured. First, the PHR is configured of a total of 24 bits by attaching the 6-zero bit to the PHR sequence of fixed 18 bits and is configured of 48 bits when the FEC encoding is performed thereon.

In order for the interleaver 230 to interleave only the encoded PHR part, the size of the interleaver 230 may be set to be 48. The interleaver 230 uses 6 as the depth level of the column and 8 as the depth level of the row and thus may be implemented by a size of 48. By doing so, when the PHR is recovered at the receiving terminal, the PHR may be recovered independent of the PSDU and thus latency may be reduced.

Since the length of the PSDU varies, the number of pad bits is changed depending on the length information of the PSDU. The number of pad bits may be calculated by the following Equation 3 in consideration of the length of the PSDU which is represented by the size and byte of the interleaver 230.

$$N_B = \text{ceiling}((8 \times LENGTH + 6)/(N_{DEPTH}/2))$$

$$N_D = N_B \times (N_{DEPTH}/2)$$

$$N_{PAD} = N_D - (8 \times LENGTH + 6) \quad \text{(Equation 3)}$$

In the above Equation 3, $N_{PAD}$ represents the number of pad bits and the LENGTH represents the length of the PSDU. The ceiling (i) is a ceiling function, and is a function of returning the smallest integer which is larger or smaller than i. The $N_{DEPTH}$ represents the size of the interleaver 230, and in FIG. 10, the $N_{DEPTH}$ is 64.

In order for the interleaver 230 to interleave the encoded PSDU part, the size of the interleaver 230 may be set to be 64. The interleaver 230 uses 8 as both of the depth levels of the column and the row, and thus may be implemented by a size of 64.

As such, the interleaver 230 may make the size of the interleaver of the PHR and the PSDU as the common implementation different. In this case, the depth levels of the column and the row may be changed in consideration of the channel environment, etc.

Figure 11:
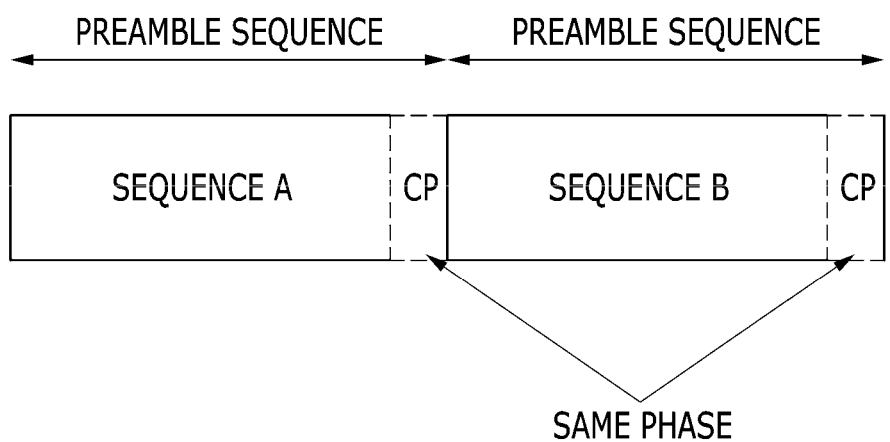
FIG. 11 is a diagram illustrating a sequence used in a preamble according to an exemplary embodiment of the present invention.

FIG. 11 is a diagram illustrating a sequence used in a preamble according to an exemplary embodiment of the present invention.

Referring to FIG. 11, the preamble is included in the SHR.

The SHR is modulated by the π/4 DQPSK scheme independent of the transmission mode. Therefore, the SHR needs to be designed based on characteristics of the π/4 DQPSK scheme. The operation SNR for recovering the PHR and the PSDU is about 2 dB, and therefore the SHR needs to be designed so that the problem of synchronization performance is not caused at the receiving terminal at 2 dB.

The preamble is used to estimate the synchronization of the signals and a frequency/clock offset at the receiving terminal. Further, in the case of a coherent receiver, a channel response may be estimated using the preamble.

The preamble includes two consecutive preamble sequences. The two preamble sequences each include sequence A and sequence B. The sequence A and the sequence B my be the same or may be different. Therefore, the packet generator 210 may generate the sequence A, repeatedly transmit the generated sequence A, and independently generate the sequence A and the sequence B. Alternatively, the sequence B may also be generated by multiplying any phase by the sequence A.

The packet generator 210 may add a cyclic prefix (CP) behind the sequence A and the sequence B, respectively. Actually, in the case of the channel in which a multipath is present, a distortion occurs in the symbol and a degree of the distortion is changed depending on the bandwidth of the channel. In the case of a narrowband channel, the distortion due to the multipath is relatively small. However, in the actual operation, it is difficult to estimate the characteristics of the channel and therefore the CP may be added behind the sequence A and the sequence B, respectively, against the channel response which may be generated.

The preamble sequence may be compatible with the modulation of the physical layer. For example, in the case of using the differential modulation, the preamble sequence itself may be combined to be configured by the differential modulation. Therefore, any typical sequence is not appropriate for the WPAN communication system according to the exemplary embodiment of the present invention.

The preamble implemented according to the present invention is designed to have a structure in which the preamble sequence may be searched in the time domain by a cross-correlation method or an auto-correlation method. By doing so, it is possible to select the complexity of a self-receiving terminal implementing a modem and provide a degree of freedom in the synchronization and error estimation which is the purpose of the preamble.

Therefore, the packet generator 210 selects the sequence having the auto-correlation feature close to a delta function as the sequence A and the sequence B, and selects the sequence A and the sequence B in which the phase of the symbol when the sequence B ends is the same as the phase of the symbol before the sequence B is transmitted, that is, when the sequence A ends. As described above, only when the reference phase at the time of performing the differential modulation on the sequence A is the same as the reference phase at the time of performing the differential modulation on the sequence B, the receiving terminal uses the correlation to be able to perform the synchronization. Therefore, the packet generator 210 may generate the sequence A and the sequence B so that the reference phases at the time of performing the differential modulation thereon are the same.

By doing so, it is possible to prevent the phases of the transmitting signals from being changed and avoid the change in the phase which occurs from mutual sequences of sequence A and sequence B by continuously transmitting any number of sequence A and sequence B. In other words, this condition can be given as shown in the following Equation 4.

Sequence=$c(0),c(1),c(2),\ldots,c(N-1)$, where
$N$=Sequence length

Phase($k$=−1)=Phase($R$=$N$−1), $c(k) \in \{DQPSK \text{ constellations}\}$, $R(\tau)=\text{sum}\_\{k=0 \text{ to } N-1\} c(k)*conj(c(k-\tau))$,(autocorrelation in sense of linear correlation or circular correlation) (Equation 4)

Condition: Find sequence that maximize $R(0)$ while minimizing $R(\tau)$ at $\tau \neq 0$.

Depending on the above Equation 4, when is not 0, a sequence to minimize $R(\tau)$ may be used as the preamble sequence.

As such, the preamble having a form to transmit the two sequences, that is, the sequence A and the sequence B is used.

In this case, when the used sequence A and sequence B are the same, the receiving terminal may easily estimate the signals by using the auto-correlation. In this case, the receiving terminal which does not previously know the preamble sequence itself may easily search for the synchronization. When the sequence A and the sequence B are different from each other, the receiving terminal uses the previously known sequence A and sequence B to be able to search for the synchronization time based on the cross-correlation scheme.

Figure 12:
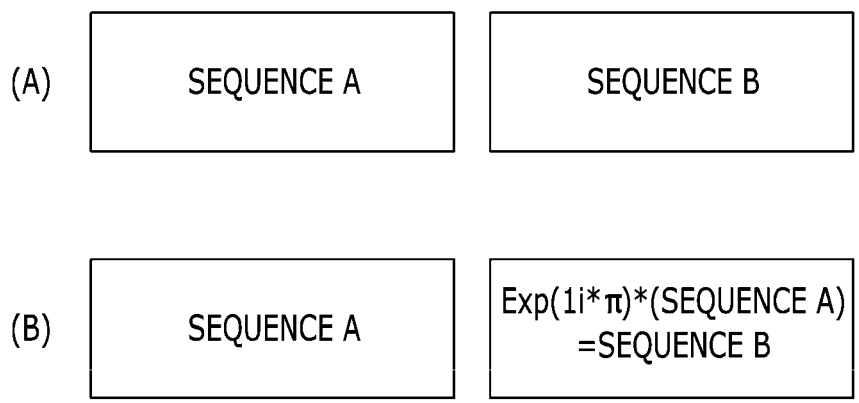
FIG. 12 is a diagram illustrating a method of generating two different sequences in a packet generator illustrated in FIG. 2.

FIG. 12 is a diagram illustrating a method of generating two different sequences in a packet generator illustrated in FIG. 2.

As illustrated in FIG. 12 A, the packet generator 210 may select the sequence A and the sequence B in any available sequence set.

As illustrated in FIG. 12 B, the packet generator 210 may select any one sequence as the sequence A in any available sequence set and may generate the sequence B at the transmission position of the sequence A by using the method of applying constant modulation. For example, the packet generator 210 may generate the sequence B by multiplying a value [exp(1i*π)] obtained by complex operating of any phase π by the sequence A transmitted from the sequence transmission position. By doing so, it is possible to help search for the synchronization time at the receiving terminal. The preamble sequence may be used to control the operation of the physical layer. For example, the packet generator 210 may previously define the preamble sequence used in the case of a downlink packet transmitting system information and may use another preamble sequence to receive and transmit other data. By doing so, when a terminal which is the receiving terminal receives the system information and the data packet, the terminal may instruct the operation of different physical layers. Further, when the terminal is synchronized with the system and is initialized, the terminal is appropriate to be used.

As another example, the packet generator 210 may use the specific preamble sequence in the channel through which the control signal is transmitted among multiple narrowband channels and may use another preamble sequence in the case of the channel generating other general peer-to-peer traffic. By doing so, frequency planning may be performed without a process of controlling a radio frequency (RF) of the terminal.

Meanwhile, when the WPAN communication system manages multiple distal nodes, a base station (coordinator) transmits the signals through multiple channels. In this case, since the signals are transmitted through the multiple channels, a peak to average power ration (PAPR) problem occurs. The signals transmitted through a single channel have a constant amplitude waveform having the differential modulation form. However, when the signals through the multiple channels are combined, the PAPR problem occurs. As the PAPR value is increased, the magnitude of the RF needs to be increased to keep a communication distance. Therefore, when the PAPR value is reduced, the system may be configured of a low-cost RF amplifier. Although the typical system uses the multiple channels, the system tends to transmit the signals while each channel is synchronized. As such, when each channel is synchronized, it is possible to easily implement the interworking of transmission and reception. In this case, however, similar to the transmission of the same preamble to each channel, the same sequence is transmitted, and thus the PAPR value of the signal is suddenly increased. Further, even in the PHR part, most of the packets are highly likely to have similar bit patterns. However, since the PSDU transmits different values, ramdomness occurs. When the randomness is high or a sum of the phases of the signals becomes 0, a PAPR is low. Therefore, the PAPR problem may occur more in the SHR and PHR parts than in the PSDU part, in which the SHR and PHR parts are parts having the best sensitivity at the receiving terminal. Therefore, to reduce the PAPR of the SHR and PHR parts, various methods may be selected.

Next, methods of reducing the PAPR in the multiple channel environment will be described.

A first method does not use the same preamble sequences for each channel. That is, the packet generator 210 uses different preamble sequences in different channels to increase the randomness. However, the method may not prevent similarity which occurs in the PHR part.

Figure 13:
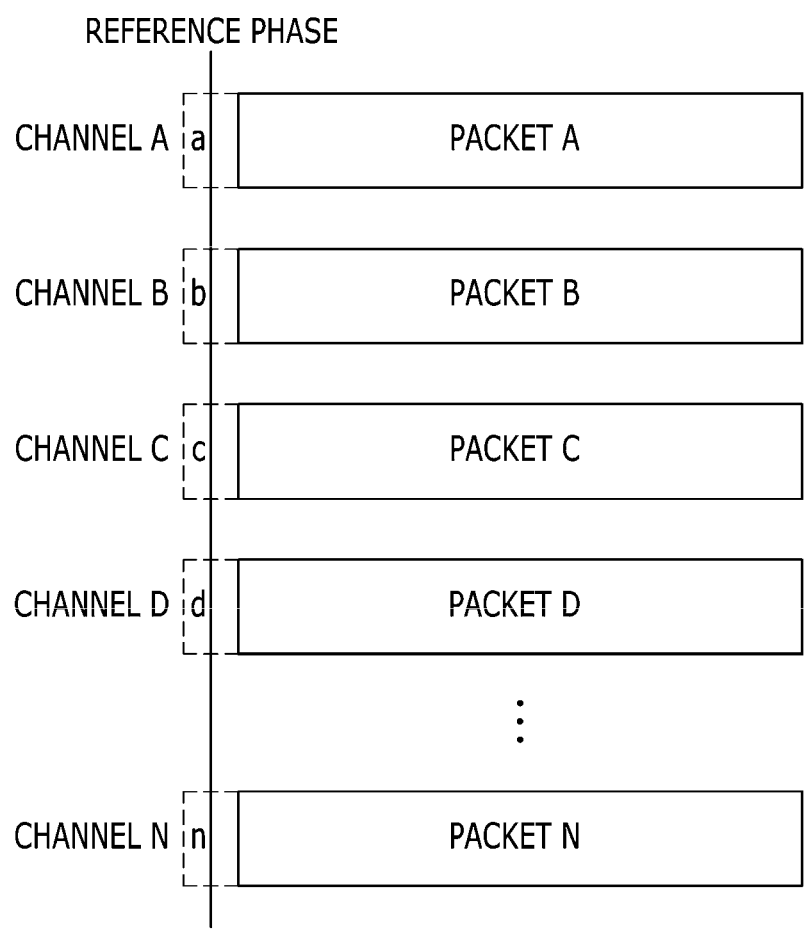
FIG. 13 is a diagram illustrating an example of a transmission method according to an exemplary embodiment of the present invention.

As illustrated in FIG. 13, a second method makes the reference phases, which are start parts of each packet, be differently set for each channel.

FIG. 13 is a diagram illustrating an example of a transmission method according to an exemplary embodiment of the present invention.

As illustrated in FIG. 13, when making reference phases a, b, c, . . . , n, which are the start parts of each packet, be differently set for each channel in the modulators 170_1 and 170_2, although the preamble sequences are the same as each other, the preamble sequences have different phases, such that the PAPR may be reduced in the preamble. Further, when the preamble sequence has the feature of returning to an original phase after transmitting the preamble, the preamble sequence may be configured to have different phases even in the PHR part. That is, at the time when the PHR is differential modulated, the phase of the ending point of the preamble becomes the reference phase of the PHR, and since the reference phase of the PHR is the predetermined reference phase for each channel, even though the PHR value has the same value, the PHR values become different waveforms for each channel in the time domain and thus may have the randomness.

Therefore, the modulator 170_1 sets the reference phases for each channel so as to prevent the reference phases for each channel from overlapping with each other.

Meanwhile, in the situation in which the multiple channels are used, the base station or the terminal may diversify the packet transmitting and receiving operation. First, in the case of the base station, the power of the transmitting apparatus is little limited and therefore the packet may be transmitted or received through all the channels. On the other hand, the case of the terminal may be divided into the case of simultaneously using the multiple channels and the case of using only the single channel. Therefore, when all the multiple channels are used, the method of transmitting a packet in the transmitting apparatus of the terminal may be proposed by being divided into the following cases.

There are a case of selecting a specific channel and transmitting the packet through the selected specific channel, a case of simultaneously transmitting the packet through subset channels among the available channels, and a case of transmitting the packet through all the available channels.

In this case, when at least two different channels are used, the transmitting apparatus of the terminal may transmit the same packet when the communication state is poor and may transmit other packets to different channels to improve throughput when the channel is good. In the receiving apparatus receiving the packet, when the same packets are received by the multiple channels, the signals are combined to be able to improve the SNR. On the other hand, when other data are input to other channels, the receiving apparatus independently decodes each packet and performs packet reordering depending on MAC information in the given PSDU.

The transmitting apparatus of the terminal may secure the channel list and define the pre-definition for channel selection by allowing the terminal or the base station to previously collect the channel information when selecting other channels.

Meanwhile, the receiving apparatus of the terminal receives the packet, there may be a case in which the receive apparatus transmits a response to the reception of the packet. In this case, acknowledgements (ACK) for each packet are transmitted through the transmitting apparatus of the terminal. In this case, the PSDU may include ACK information. When the receiving apparatus of the terminal receives different packets through several channels, the transmitting apparatus of the terminal may transmit one ACK to all the groups.

When performing more detailed packet retransmission control, the transmitting apparatus of the terminal may separately generate ACK/non-acknowledgement (NACK) for each channel and may transmit the generated ACK/NACK. In this case, the transmitting apparatus of the terminal may transmit ACK through a primary channel (channel determined by mutual communication or channel first connected) mainly used in the transmitting apparatus transmitting the packet, or may transmit ACK to each channel through transmitting channels of as many as the number of channels of the received packets.

When other packets are received by different channels, different ACK/NACK may also be transmitted to each channel. Since the case in which the same packet is transmitted to different channels is the case in which the wireless environment is poor, the ACK/NACK may be transmitted through the same number of transmitting channels as the number of channels of the received packets.

In the case in which at any one point in time, only one channel among the multiple channels may be used, the following operation scenario may be possible. First, the terminal and the base station are operated based on the channel in which communication is established. Next, when the packet transmission fails, the channel performing the retransmission and new packet transmission may be selected after the packet transmission fails, depending on the previously defined channel order or the channel order designated during the communication establishment in the available channel lists. By doing so, a good channel may be selected while the response characteristics of the channel are changed over time.

In connection with the available multiple channels, the terminal may again report the receiving response characteristics of the channel to the base station based on the received signal. Further, the base station may designate the channel to be used by the terminal based on the signal received from the terminal. In this case, to measure the characteristics of the signal, the terminal may perform an operation of transmitting the packet including only the preamble and the PHR to each channel, or the packet including the preamble, the PHR, and its own ID information to each channel. By the process, the base station and the terminal select the channel with good characteristics from the multiple channels to be able to increase the SNR of the received signal and improve the throughput.

An embodiment of the present invention may be implemented in a computer system, e.g., as a computer readable medium.

Figure 14:
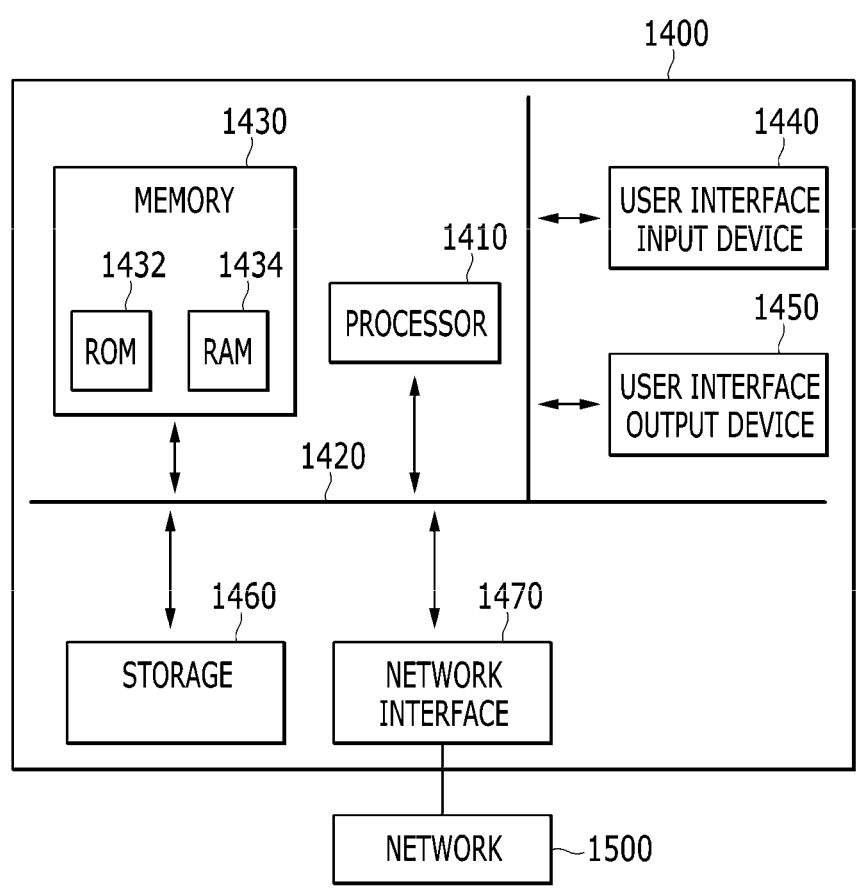
FIG. 14 is a diagram illustrating a computer system according to the exemplary embodiment of the present invention.

FIG. 14 is a diagram illustrating a computer system according to the exemplary embodiment of the present invention.

As shown in FIG. 14, a computer system 1400 may include one or more of a processor 1410, a memory 1430, a user input device 1140, a user output device 1450, and a storage 1460, each of which communicates through a bus 1420. The computer system 1400 may also include a network interface 1470 that is coupled to a network 1500. The processor 1410 may be a central processing unit (CPU) or a semiconductor device that executes processing instructions stored in the memory 1430 and/or the storage 1460. The memory 1430 and the storage 1460 may include various forms of volatile or non-volatile storage media. For example, the memory may include a read-only memory (ROM) 1432 and a random access memory (RAM) 1434.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the exemplary embodiments of the present invention, it is possible to secure reliable communication quality even in poor conditions and smoothly implement the AMI WPAN networking by providing various transmission rates.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a signal in an allocated frequency bandwidth by a transmitting apparatus of a wireless personal area network (WPAN) communication system, the method comprising:
   generating a synchronization header, a physical layer header, and a physical layer service data unit;
   multiplexing the synchronization header and the physical layer header into a bit stream;
   modulating the multiplexed bit stream by a first differential phase modulation scheme;
   modulating the physical layer service data unit by a second differential phase modulation scheme;
   multiplexing a symbol modulated by the first differential phase modulation scheme and a symbol modulated by the second differential phase modulation scheme into a symbol stream; and
   transmitting the symbol stream.

2. The method of claim 1, further comprising
   forward error correction encoding the physical layer service data unit before the modulating of the physical layer service data unit.

3. The method of claim 1, further comprising
   scrambling the physical layer service data unit, before the modulating of the physical layer service data unit.

4. The method of claim 1, further comprising
   spreading the physical layer service data unit, before or after the modulating of the physical layer service data unit.

5. The method of claim 4, wherein
the spreading before the modulating of the physical layer service data unit includes repeating the bit stream of the physical layer service data unit in a bit group unit.

6. The method of claim 5, wherein
the bit group includes
bits of the number of bits configuring one symbol, or
bits obtained by multiplying the number of bits configuring one symbol by the predetermined number of symbols.

7. The method of claim 5, wherein the spreading includes adding padding behind each bit group.

8. The method of claim 4, wherein
after the modulating of the physical layer service data unit, the spreading includes:
adjacently repeating the symbols; and
changing the symbols to be repeated.

9. The method of claim 1, further comprising at least one of:
before the modulating of the multiplexed bit stream, forward error correction encoding the physical layer header; and
before or after the modulating of the multiplexed bit stream, spreading the physical layer header.

10. The method of claim 1, wherein the first modulation scheme includes a π/4 DQPSK scheme and the second modulation scheme includes the π/4 DQPSK scheme or a π/8 D8PSK scheme.

11. The method of claim 1, wherein
the synchronization header includes a preamble, and
the generating includes generating a first preamble sequence and a second preamble sequence used as the preamble.

12. The method of claim 1, wherein the modulating of the bit stream includes differently setting reference phases for each channel.

13. The method of claim 1, wherein
the physical layer header includes a length of the physical layer service data unit and information required to recover the physical layer service data unit, and
the information required to recover the physical layer service data unit includes at least one of a modulation scheme, whether scrambling is applied, whether the forward error correction encoding is applied, and whether spreading is applied.

14. The method of claim 1, further comprising
interleaving the physical layer service data unit, before the modulating of the physical layer service data unit.

15. The method of claim 1, wherein the physical layer service data unit includes a response signal to a success/failure of the reception of a packet.

16. A transmitting apparatus of a wireless personal area network (WPAN) communication system, the transmitting apparatus comprising:
a packet generator generating a synchronization header, a physical layer header, and a physical layer service data unit;
a first modulator modulating the synchronization header and the physical layer header by a first differential phase modulation scheme;
a second modulator modulating the physical layer service data unit by a second differential phase modulation scheme; and
a transmitter transmitting a symbol modulated by the first differential phase modulation scheme and a symbol modulated by the second differential phase modulation scheme.

17. The transmitting apparatus of claim 16, wherein
the synchronization header includes a preamble, and
the preamble includes at least two preamble sequences.

18. The transmitting apparatus of claim 16, further comprising
a spreader spreading the physical layer header and the physical layer service data unit before modulating the physical layer header and the physical layer service data unit.

19. The transmitting apparatus of claim 18, wherein
the spreader repeats the physical layer header and a bit stream of the physical layer service data unit, respectively, in a bit group unit, and
the bit group includes bits of the number of bits configuring one symbol or
bits obtained by multiplying the number of bits configuring one symbol by the predetermined number of symbols.

20. The transmitting apparatus of claim 16, further comprising at least one of:
before modulating the physical layer service data unit,
a scrambler scrambling the physical layer service data unit;
an encoder performing forward error correction encoding on the physical layer service data unit; and
an interleaver interleaving the physical layer service data unit.

* * * * *